United States Patent
Frattini et al.

(10) Patent No.: US 8,605,467 B2
(45) Date of Patent: Dec. 10, 2013

(54) HIGH STEP-UP RATIO SOFT-SWITCHED FLYBACK CONVERTER

(75) Inventors: Giovanni Frattini, Travaco Siccomario (IT); Giorgio Spiazzi, Legnago (IT); Paolo Mattavelli, Padua (IT)

(73) Assignee: National Semiconductor Corporation, Santa Clara, CA (US)

( * ) Notice: Subject to any disclaimer, the term of this patent is extended or adjusted under 35 U.S.C. 154(b) by 378 days.

(21) Appl. No.: 12/800,618

(22) Filed: May 19, 2010

(65) Prior Publication Data

US 2011/0013425 A1 Jan. 20, 2011

(30) Foreign Application Priority Data

Jul. 17, 2009 (IT) .............................. MI2009A1273

(51) Int. Cl.
*H02M 3/335* (2006.01)
*H02H 7/122* (2006.01)

(52) U.S. Cl.
USPC .................................... 363/21.12; 363/56.01

(58) Field of Classification Search
USPC ........ 323/222, 207; 363/16, 20, 21.01, 21.02, 363/21.12, 55, 56.01, 95, 97, 131
See application file for complete search history.

(56) References Cited

U.S. PATENT DOCUMENTS

| | | | |
|---|---|---|---|
| 4,899,270 A | 2/1990 | Bond | |
| 5,598,324 A * | 1/1997 | Imamura et al. | 363/21.02 |
| 6,175,219 B1 | 1/2001 | Imamura et al. | |
| 6,504,497 B2 * | 1/2003 | Jang et al. | 341/125 |
| 6,650,551 B1 | 11/2003 | Melgarejo | |
| 7,218,081 B2 * | 5/2007 | Jang et al. | 323/266 |
| 8,058,747 B2 * | 11/2011 | Avrutsky et al. | 307/43 |
| 2006/0012348 A1 | 1/2006 | Zhao et al. | |
| 2006/0185727 A1 | 8/2006 | Matan | |
| 2012/0299503 A1 * | 11/2012 | Aharon | 315/224 |

FOREIGN PATENT DOCUMENTS

| | | |
|---|---|---|
| KR | 1020080065817 A | 7/2008 |
| WO | WO 2008/033984 A2 | 3/2008 |
| WO | WO2008033984 | 3/2008 |

OTHER PUBLICATIONS

Roger Gules, et al., "An Interleaved Boost DC-DC Converter with Large Conversion Ratio," In IEEE International Symposium on Power Electronic (ISIE), vol. 1, Jun. 2003, p. 411-416.

Marcos Prudente, et al., "Voltage Multiplier Cells Applied to Non-Isolated DC-DC Converters," IEEE Transactions on Power Electronics, vol. 23, No. 2, Mar. 2008, p. 871-887.

(Continued)

*Primary Examiner* — Matthew Nguyen

(74) *Attorney, Agent, or Firm* — William B. Kempler; W. James Brady, III; Frederick J. Telecky, Jr.

(57) ABSTRACT

A converter circuit includes a transformer having a first side and a second side. The converter circuit also includes a switch coupled to the first side of the transformer. The converter circuit further includes a rectifying diode coupled to the second side of the transformer and to a first output terminal of the converter circuit. In addition, the converter circuit includes a clamping diode coupled to the second side of the transformer, to the rectifying diode, and to a second output terminal of the converter circuit. The converter circuit may include a boost section and a flyback section. The converter circuit may also include an active clamp and an isolated flyback section.

10 Claims, 6 Drawing Sheets

(56) References Cited

OTHER PUBLICATIONS

Yungtaek Jang, et al., "Interleaved Boost Converter With Intrinsic Voltage-Doubler Characteristic for Universal-Line PFC Front End," IEEE Transactions on Power Electronics, vol. 22, No. 4, Jul. 2007, p. 1394-1401.

Qun Zhao, et al., "High-Efficiency, High Step-Up DC-DC Converters," IEEE Transactions on Power Electronics, vol. 18, No. 1, Jan. 2003, p. 65-73.

Su man Dwari, et al., "A Novel High Efficiency High Power Interleaved Coupled-Inductor Boost DC-DC Converter for Hybrid and Fuel Cell Electric Vehicle," IEEE Vehicle Power and Propulsion Conf. (VPPC), Sep. 2007, p. 399-404.

K.C. Tseng, et al., "Novel high-efficiency step-up converter," IEE Proc. Electr. Power Appl., vol. 151, No. 2, Mar. 2004, p. 182-190.

T. J. Liang, et al., "Analysis of integrated boost-flyback step-up converter," IEE Proc. Electr. Power Appl., vol. 152, No. 2, Mar. 2005, p. 217-225.

Rong-Jong Wai, et al., "High-Efficiency DC-DC Converter With High Voltage Gain and Reduced Switch Stress," IEEE Transactions on Industrial Electronics, vol. 54, No. 1, Feb. 2007, p. 354-364.

R. J. Wai, et al., "High-efficiency DC/DC converter with high voltage gain," IEE Proc. Electr. Power Appl., vol. 152, No. 4, Jul. 2005, p. 793-802.

Grover V. Torrico-Bascopé, et al., "A Generalized High Voltage Gain Boost Converter Based on Three-State Switching Cell," IEEE Industrial Electronics Society Ann. Meet. (IECON), Nov. 2006, p. 1927-1932.

Evandro A. Soares da Silva, et al., "A Novel Interleaved Boost Converter with High Voltage Gain for UPS Applications," Brazilian Power Electronics Conf. (COMEP), 2007, p. 999-1003.

S. V. Araùjo, et al., "Step-Up Converter with High Voltage Gain Employing Three-State Switching Cell and Voltage Multiplier," IEEE Power Electronics Specialists Conf. (PESC), 2008, p. 2271-2277.

Ju-Won Baek, et al., "High Boost Converter Using Voltage Multiplier," IEEE Industrial Electronics Society Ann. Meet. (IECON), Nov. 2005, p. 567-572.

P. Alou, et al., "Flyback with Active Clamp: a suitable topology for Low Power and Very Wide Input Voltage Range applications" IEEE Applied Power Electronics Conf. (APEC), 2002, p. 242-248.

P. Alou, et al., "A low power topology derived from Flyback with Active Clamp based on a very simple transformer," IEEE Applied Power Electronics Conf. (APEC), 2006, p. 627-632.

A. Bakkali, et al., "Average modeling and analysis of a Flyback with Active Clamp topology based on a very simple transformer," IEEE Applied Power Electronics Conf. (APEC), 2007, p. 500-506.

Nikolaos P. Papanikolaou, et al., "Active Voltage Clamp in Flyback Converters Operating in CCM Mode Under Wide Load Variation," IEEE Transactions on Industrial Electronics, vol. 51, No. 3, Jun. 2004, p. 632-640.

Bor-Ren Lin, et al., "Analysis, design and implementation of an active clamp flyback converter," IEEE PEDS, 2005, p. 424-429.

G.A.L. Henn, et al., "A Novel Bidirectional Interleaved Boost Converter with High Voltage Gain", 2008 IEEE, p. 1589-1594.

Extended Search Report dated Feb. 5, 2010 in connection with Italian Patent Application No. MI20091273.

Notification of Transmittal of the International Search Report and the Written Opinion of the International Searching Authority, or the Declaration dated Feb. 16, 2011 in connection with International Patent Application No. PCT/US2010/042350.

Italian Search Report mailed Feb. 5, 2010.

"What is Freewheel Diodes?" http://www.edaboard.com/thread61984.html, Jul. 12, 2013.

\* cited by examiner

HIGH STEP-UP RATIO SOFT-SWITCHED FLYBACK CONVERTER

CROSS-REFERENCE TO RELATED APPLICATIONS AND PRIORITY CLAIM

This application claims priority under 35 U.S.C. §119 to Italian Patent Application No. MI2009A001273 filed on Jul. 17, 2009.

This application is related to the following U.S. patent applications:
U.S. patent application Ser. No. 12/152,478 filed on May 14, 2008;
U.S. patent application Ser. No. 12/152,479 filed on May 14, 2008;
U.S. patent application Ser. No. 12/152,491 filed on May 14, 2008;
U.S. patent application Ser. No. 12/152,566 filed on May 14, 2008;
U.S. patent application Ser. No. 12/272,990 filed on Nov. 18, 2008;
U.S. patent application Ser. No. 12/386,958 filed on Apr. 24, 2009;
U.S. patent application Ser. No. 12/454,136 filed on May 13, 2009;
U.S. patent application Ser. No. 12/454,244 filed on May 14, 2009;
U.S. patent application Ser. No. 12/456,776 filed on Jun. 23, 2009; and
U.S. patent application Ser. No. 12/456,777 filed on Jun. 23, 2009.

All of the above-identified Italian and U.S. patent applications are hereby incorporated by reference.

TECHNICAL FIELD

This disclosure is generally directed to energy generating systems. More specifically, this disclosure is directed to a high step-up ratio soft-switched flyback converter and related system and method.

BACKGROUND

There is an increasing demand for high step-up ratio converters that are able to efficiently interface low-voltage high-current energy sources with utility grids. For example, this demand is present in power electronics systems that include batteries as energy storage elements. This demand is also present in emerging applications like energy processing from renewable energy sources, such as photovoltaic panels and fuel cells.

As a particular example, in the application field of photovoltaic panels (i.e. solar power), there is an increasing interest in the development of converters to interface single photovoltaic panels with utility grids. This would allow power generated by a photovoltaic panel to be injected into a utility grid for use elsewhere. While various types of converters have been proposed, they all suffer from various drawbacks.

BRIEF DESCRIPTION OF DRAWINGS

For a more complete understanding of this disclosure and its features, reference is now made to the following description, taken in conjunction with the accompanying drawings, in which.

DETAILED DESCRIPTION

Figure 1:
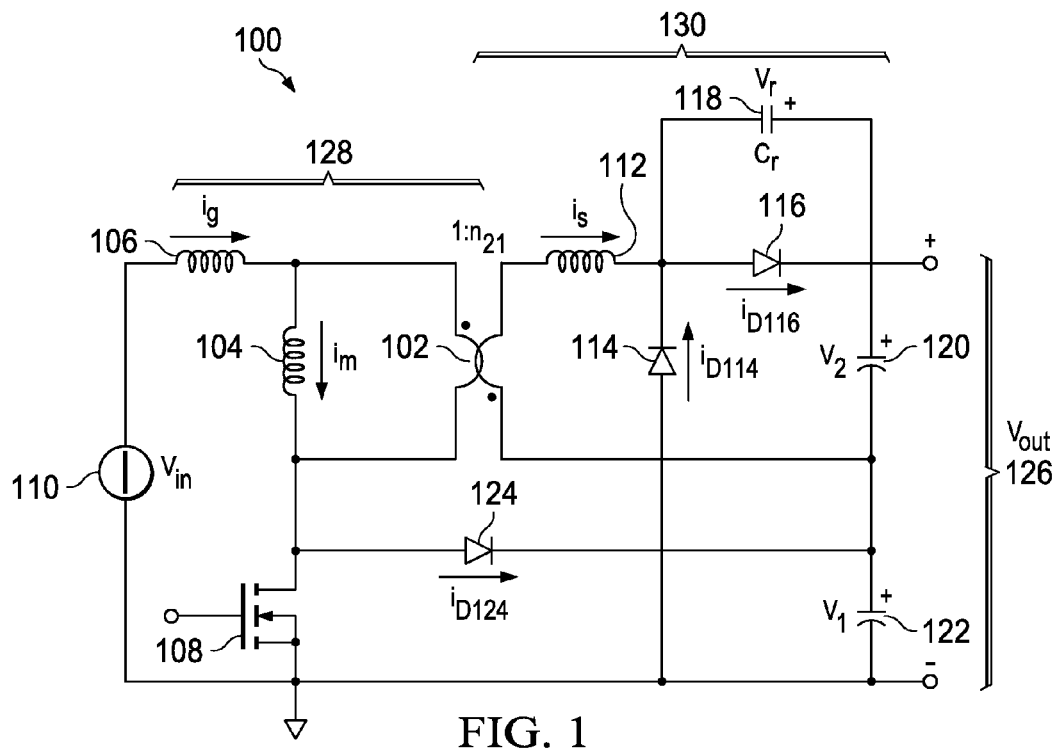
FIGS. 1 through 3G illustrate an example non-isolated high step-up ratio converter and related details according to this disclosure.

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

This disclosure generally describes novel architectures for high-gain converters, where different embodiments lack and include isolation between their inputs and outputs. Clamping diodes are used in the converters to naturally clamp parasitic oscillations within the converters. Resonances also occur within the converters, which help to increase the converters' voltage gains. Two example embodiments of the high-gain converters are described below.

Non-Isolated Converter

FIGS. 1 through 3G illustrate an example non-isolated high step-up ratio converter 100 and related details according to this disclosure. The embodiment of the converter 100 shown in FIG. 1 and its related details are for illustration only.

In this example, the converter 100 includes a transformer 102 having a primary side on the left and a secondary side on the right. The transformer 102 could have any suitable ratio between its primary and secondary sides. In this example, the ratio is denoted $1:n_{21}$.

The primary side of the transformer 102 is associated with a magnetizing inductance 104 and a primary leakage inductance 106. A magnetizing current $i_m$ flows through the magnetizing inductance 104, and an input current $i_g$ flows through the primary leakage inductance 106.

The primary side of the transformer 102 is coupled to a switch 108 and to an input voltage source 110, which provides an input voltage $V_{in}$. The switch 108 represents any suitable switching device, such as a MOSFET transistor. The input voltage source 110 represents any suitable source of an input voltage, such as a battery or photovoltaic panel.

The secondary side of the transformer 102 is associated with a secondary leakage inductance 112, and a secondary current $i_s$ flows through the secondary leakage inductance 112. The secondary side of the transformer 102 is coupled to a diode 114 and a diode 116. Parasitic capacitances of the diodes 114-116 are grouped into one equivalent capacitance 118. The resonant capacitance of the equivalent capacitance 118 is denoted $C_r$, and the resonant voltage across the equivalent capacitance 118 is denoted $V_r$. The secondary side of the transformer 102 and the diode 116 are coupled to a capacitor 120, and the secondary side of the transformer 102 and the capacitor 120 are coupled to another capacitor 122. The capacitors 120-122 represent any suitable capacitors having any suitable capacitance(s). A voltage across the capacitor 122 is denoted $V_1$, and a voltage across the capacitor 120 is denoted $V_2$.

An additional diode 124 is coupled to the switch 108, the primary and secondary sides of the transformer 102, the capacitor 120, and the capacitor 122. The diodes 114, 116, and 124 represent any suitable structures capable of substantially limiting current flow in one direction, such as RHRP1560 diodes from FAIRCHILD SEMICONDUCTOR INC. In this example embodiment, the diode 124 represents a boost diode, the diode 116 represents a rectifying diode, and the diode 114 represents a clamping diode. In the following discussion, the capacitances of the switch 108 and the diode 124 can be neglected because they are charged and discharged very fast by a much higher input current $i_g$.

The converter 100 in FIG. 1 operates to produce an output voltage $V_{out}$ 126 across a pair of output terminals. In this example, the converter 100 generally includes two sections, a boost section 128 and a flyback section 130. Example details regarding the operation of the converter 100 are illustrated in FIG. 2.

Figure 2:
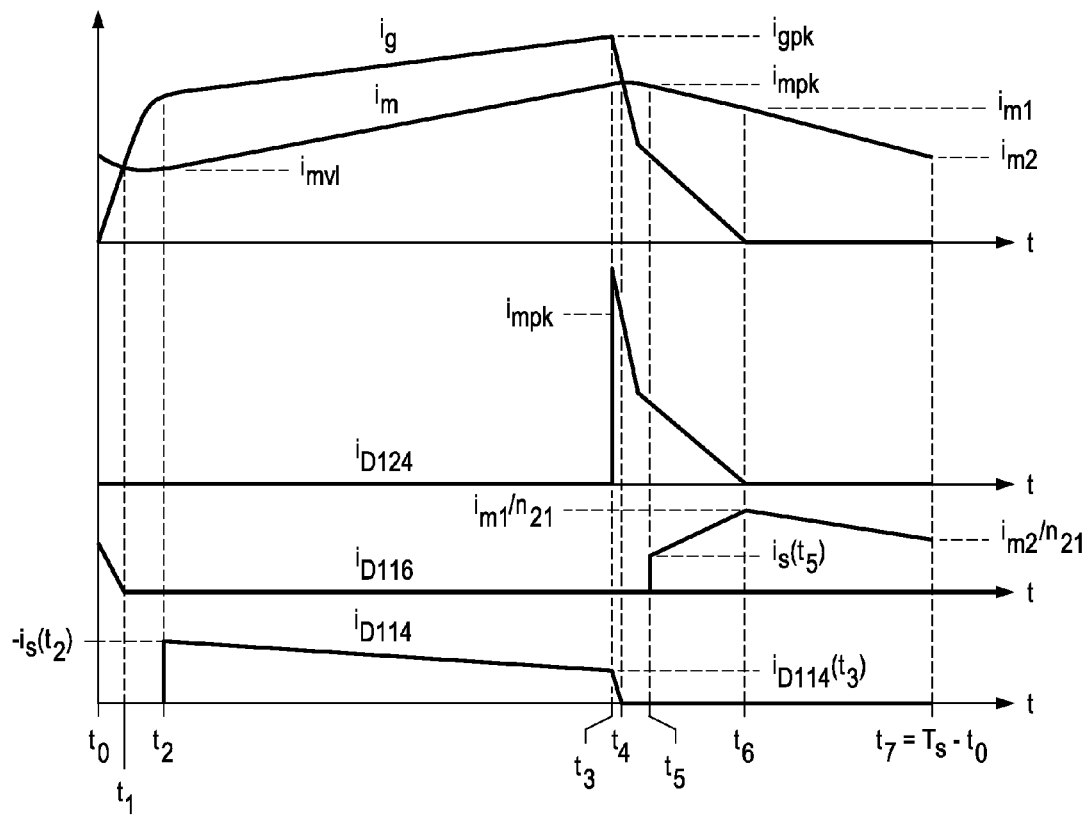

FIG. 2 illustrates waveforms associated with example operation of the converter 100 in FIG. 1. More specifically, FIG. 2 illustrates the waveforms in the converter 100 during a switching period $T_s$ that lasts from time $t_0$ to time $t_7$, assuming the boost section 128 operates in discontinuous conduction mode (DCM) and the flyback section 130 operates in continuous conduction mode (CCM). This choice allows for the use of a single magnetic component (the transformer 102) in the converter 100 and does not require an external input inductance, while the converter 100 achieves a zero current switch turn on without reverse recovery effects.

The waveforms shown in FIG. 2 include the input current $i_g$, the magnetizing current $i_m$, and three diode currents $i_{D114}$, $i_{D116}$, and $i_{D124}$ across the diodes 114, 116, and 124. In FIG. 2, $i_{gpk}$ denotes the maximum value of the input current $i_g$, and $i_{mpk}$ and $i_{mvl}$ denote the maximum and minimum values of the magnetizing current $i_m$. Also, $i_{m1}$ and $i_{m2}$ denote the values of the magnetizing current $i_m$ at times $t_6$ and $t_7$. In addition, $i_s(t_2)$ and $i_s(t_5)$ denote the values of the secondary current $i_s$ at times $t_2$ and $t_5$, and $i_{D114}(t_3)$ denotes the value of the diode current $i_{D114}$ at time t3.

As shown in FIG. 2, each switching period $T_s$ can be divided into seven subintervals, which are denoted below as $T_{01}$-$T_{67}$. The operation of the converter 100 during each of these subintervals is described below. The operation of the converter 100 during each subinterval may be referred to as an operational mode of the converter 100.

Interval $T_{01}$ (Time $t_0$ Through Time $t_1$)

Figure 3A:
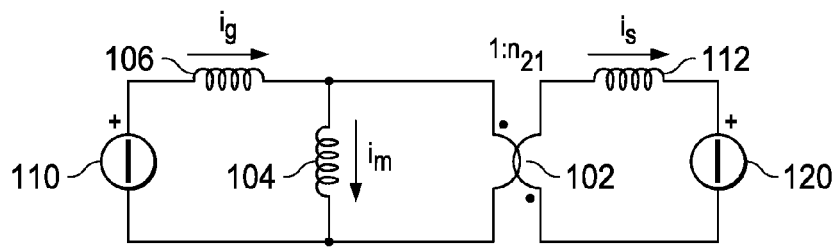

Prior to this interval, the diode 116 is conducting, and the energy stored in the magnetizing inductance 104 is being transferred to the capacitor 120. At time $t_0$, the switch 108 is turned on (closed). The equivalent circuit of the converter 100 at this point is shown in FIG. 3A, where the capacitor 120 is represented as a voltage source. From this equivalent circuit, the inductor voltages during this interval $T_{01}$ can be obtained:

$$V_{Lm}^{T01} = \frac{\lambda V_{in} - \gamma n_{21} V_2}{1 + \lambda + \gamma n_{21}^2} \tag{1}$$

$$V_{Ld}^{T01} = \frac{V_{in}(1 + \gamma n_{21}^2) + \gamma n_{21} V_2}{1 + \lambda + \gamma n_{21}^2} \tag{2}$$

$$V_{Ls}^{T01} = -\frac{(1 + \lambda)V_2 + n_{21}\lambda V_{in}}{1 + \lambda + \gamma n_{21}^2}. \tag{3}$$

Here, $V_{Lm}^{T01}$, $V_{Ld}^{T01}$, and $V_{Ls}^{T01}$ denote the voltages on the magnetizing inductance 104, the primary leakage inductance 106, and the secondary leakage inductance 112 during the interval $T_{01}$. Also, $$\lambda = \frac{L_m}{L_d} \text{ and } \gamma = \frac{L_m}{L_s},$$

where $L_m$ denotes the magnetizing inductance 104, $L_d$ denotes the primary leakage inductance 106, and $L_s$ denotes the secondary leakage inductance 112.

During the interval $T_{01}$ as shown in FIG. 2, turning on the switch 108 causes the input current $i_g$ to increase and the diode current $i_{D116}$ to decrease. Since the diode 116 is still conducting, the magnetizing current $i_m$ decreases linearly during this interval $T_{01}$. This interval $T_{01}$ ends when the input current $i_g$ equals the magnetizing current $i_m$ and the diode current $i_{D116}$ goes to zero.

Interval $T_{12}$ (Time $t_1$ Through Time $t_2$)

Figure 3B:
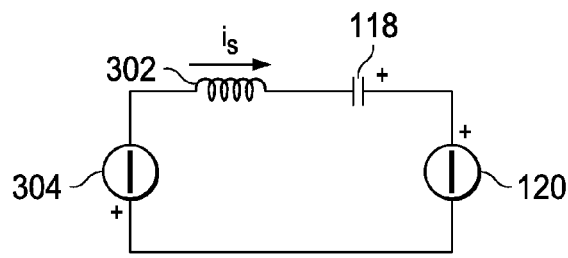

When the input current $i_g$ equals the magnetizing current $i_m$ at time $t_1$, the diode 116 turns off, allowing a resonance to occur according to the equivalent circuit of the converter 100 shown in FIG. 3B. As already stated above, the resonant capacitance 118 (denoted $C_r$) accounts for the parasitic capacitances of the diodes 114-116, while a resonant inductance 302 (denoted $L_r$) of the diodes 114-116 can be given by:

$$L_r = L_s + n_{21}^2 \frac{L_d L_m}{L_d + L_m}. \tag{4}$$

The secondary winding voltage 304 of the transformer 102 during the interval $T_{12}$ (denoted $V_s^{T12}$) is shown in FIG. 3B as a voltage source and can be given by:

$$V_s^{T12} = n_{21} V_{in} \frac{L_m}{L_d + L_m} = n_{21} V_{in} \frac{\lambda}{1 + \lambda}. \tag{5}$$

When $i_s(t_1)=0$ and $V_r(t_1)=0$, the resonant voltage $V_r(t)$ and the secondary current $i_s(t)$ can be given by:

$$V_r(t) = (V_2 + V_s^{T12})[1 - \cos(\omega_r(t - t_1))] \tag{6}$$

$$i_s(t) = -\frac{V_2 + V_s^{T12}}{Z_r} \sin(\omega_r(t - t_1))] \tag{7}$$

where $$\omega_r = \frac{1}{\sqrt{L_r C_r}} \text{ and } Z_r = \sqrt{\frac{L_r}{C_r}}$$

are the resonance frequency and the characteristic impedance, respectively.

The interval $T_{12}$ ends as soon as the voltage $V_r(t)$ equals the output voltage $V_{out}$, causing the conduction of the clamping diode 114. The duration $D_{T12}$ of the interval $T_{12}$ can be given by:

$$\omega_r D_{T12} = a\cos\left(1 - \frac{V_{out}}{V_2 + V_s^{T12}}\right) \quad (8)$$

The value of the secondary current $i_s$ at the end of this interval $T_{12}$ can be expressed as:

$$i_s(t_2) = -\frac{V_{out}}{Z_r}\sqrt{2\frac{V_2 + V_s^{T12}}{V_{out}} - 1} \quad (9)$$

The values of the input current $i_g$ and the magnetizing current $i_m$ at time $t_2$ can be calculated as:

$$i_g(t_2) = i_g(t_1) - n_{21} i_s(t_2)\frac{\lambda}{1+\lambda} \quad (10)$$

$$i_m(t_2) = i_m(t_1) + n_{21} i_s(t_2)\frac{1}{1+\lambda} \quad (11)$$

Interval $T_{23}$ (Time $t_2$ Through Time $t_3$)

Figure 3C:
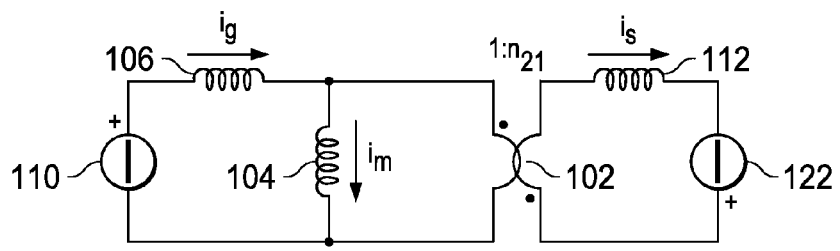
Figure 3D:
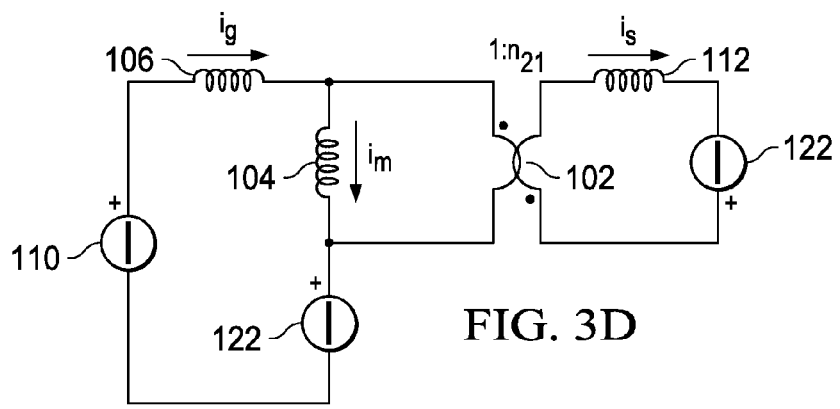

When the clamping diode 114 turns on, the equivalent circuit of the converter 100 becomes as shown in FIG. 3C, where the capacitor 122 is represented as a voltage source. The inductor voltages during this interval $T_{23}$ can be expressed as:

$$V_{Lm}^{T23} = \frac{\lambda V_{in} + \gamma n_{21} V_1}{1 + \lambda + \gamma n_{21}^2} \quad (12)$$

$$V_{Ld}^{T23} = \frac{V_{in}(1 + \gamma n_{21}^2) - \gamma n_{21} V_1}{1 + \lambda + \gamma n_{21}^2} \quad (13)$$

$$V_{Ls}^{T23} = \frac{(1+\lambda)V_1 - n_{21}\lambda V_{in}}{1 + \lambda + \gamma n_{21}^2}. \quad (14)$$

Once again, the corresponding currents in FIG. 2 can vary linearly during this interval $T_{23}$. Neglecting the resonance during the interval $T_{12}$, the clamping diode 114 may turn on during the switch on time only if the following condition is satisfied:

$$V_{in} n_{21} \frac{\lambda}{1+\lambda} > V_1. \quad (15)$$

However, the presence of the parasitic components causes a non-zero current through the diode 114 even if Equation (15) is not satisfied. In this case, the current through the diode 114 simply has a negative current slope (the voltage $V_{Ls}^{T23}$ is positive), meaning that it can go to zero before the end of the switch on time, thus causing the turn off of the diode 114. In the following analysis, it is assumed that the diode 114 conducts for the whole switch on time interval.

Interval $T_{34}$ (Time $t_3$ Through Time $t_4$)

At time $t_3$, the switch 108 is turned off (opened), causing the conduction of the boost freewheeling diode 124. During this interval $T_{34}$, the diode 114 is still conducting, giving rise to the equivalent circuit of the converter 100 shown in FIG. 3D. Here, the capacitor 122 is represented as two separate voltage sources. The inductor voltages during this interval $T_{34}$ can be expressed as:

$$V_{Lm}^{T34} = \frac{\lambda(V_{in} - V_1) + \gamma n_{21} V_1}{1 + \lambda + \gamma n_{21}^2} \quad (16)$$

$$V_{Ld}^{T34} = \frac{(V_{in} - V_1)(1 + \gamma n_{21}^2) - \gamma n_{21} V_1}{1 + \lambda + \gamma n_{21}^2} \quad (17)$$

$$V_{Ls}^{T34} = \frac{(1+\lambda)V_1 - n_{21}\lambda(V_{in} - V_1)}{1 + \lambda + \gamma n_{21}^2}. \quad (18)$$

As shown in FIG. 2, during the interval $T_{34}$, the input current $i_g$ rapidly decreases, while the magnetizing current $i_m$ continues to increase. This interval $T_{34}$ ends when the input current $i_g$ equals the magnetizing current $i_m$ and the diode current $i_{D114}$ zeroes. After that, the diode 116 starts conducting after a short resonance stage (during interval $T_{45}$) that discharges the resonant capacitance 118 to zero.

Interval $T_{45}$ (Time $t_4$ Through Time $t_5$)

Figure 3E:
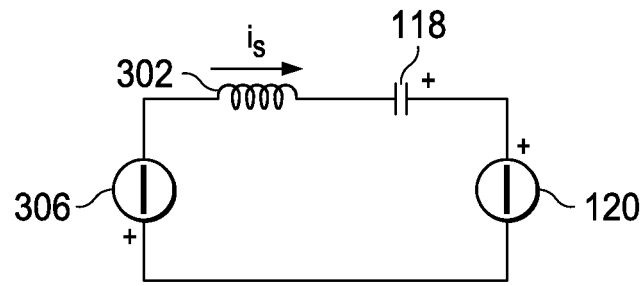

When the diode 114 turns off, a second resonance occurs that brings the resonant voltage $V_r$ of the capacitance 118 to zero, thus turning on the diode 116. The equivalent circuit of the converter 100 during this interval $T_{45}$ is shown in FIG. 3E. The secondary winding voltage 306 of the transformer 102 during the interval $T_{45}$ (denoted $V_s^{T45}$) can be given by:

$$V_s^{T45} = n_{21}(V_{in} - V_1)\frac{\lambda}{1+\lambda} \quad (19)$$

and $i_s(t_4)=0$ and $V_r(t_4)=V_{out}$. Since $V_{out}=V_1+V_2$, the resonant voltage $V_r(t)$ and the secondary current $i_s(t)$ can be given by:

$$V_r(t) = V_{out} + (V_s^{T45} - V_1)[1 - \cos(\omega_r(t - t_4))] \quad (20)$$

$$i_s(t) = \frac{V_1 - V_s^{T45}}{Z_r}\sin(\omega_r(t - t_4))]. \quad (21)$$

This interval $T_{45}$ ends at time $t_5$ when the resonant voltage $V_r$ becomes zero and the diode 116 turns on. The duration $D_{T45}$ of the interval $T_{45}$ can be given by:

$$\omega_r D_{T45} = a\cos\left(1 - \frac{V_{out}}{V_1 - V_s^{T45}}\right) \quad (22)$$

From Equations (21) and (22), the value of the secondary current $i_s$ at the end of this interval can be expressed as:

$$i_s(t_5) = \frac{V_{out}}{Z_r}\sqrt{2\frac{V_1 - V_s^{T45}}{V_{out}} - 1} \quad (23)$$

The values of the input current $i_g$ and the magnetizing current $i_m$ can be found using expressions similar to Equations (10) and (11) by substituting $t_1$ with $t_4$ and $t_2$ with $t_5$.

Interval $T_{56}$ (Time $t_5$ Through Time $t_6$)

Figure 3F:
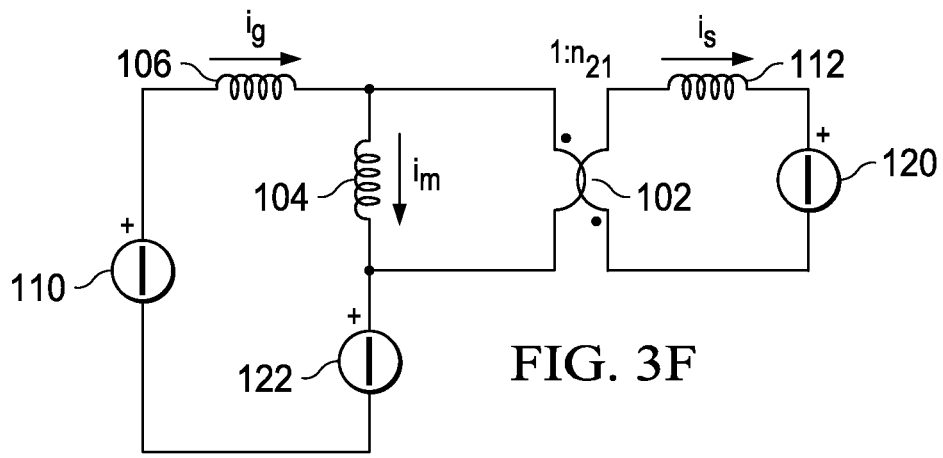
Figure 3G:
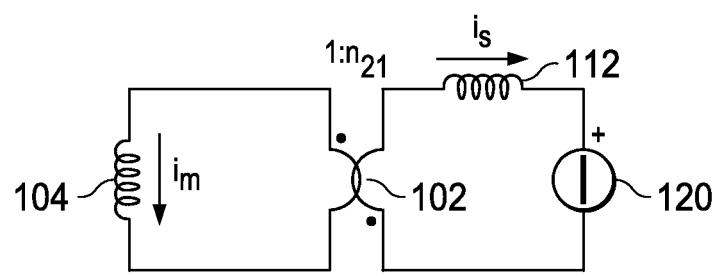

During this interval, the energy stored in the magnetizing inductance 104 is delivered to the flyback section's output, while the energy stored in the leakage inductance 106 continues to be delivered to the boost section's output according to the equivalent circuit of the converter 100 shown in FIG. 3F. The inductor voltages during the interval $T_{56}$ can be expressed as:

$$V_{Lm}^{T56} = \frac{\lambda(V_{in} - V_1) + \gamma n_{21} V_2}{1 + \lambda + \gamma n_{21}^2} \quad (24)$$

$$V_{Ld}^{T56} = \frac{(V_{in} - V_1)(1 + \gamma n_{21}^2) - \gamma n_{21} V_2}{1 + \lambda + \gamma n_{21}^2} \quad (25)$$

$$V_{Ls}^{T56} = \frac{-(1+\lambda)V_2 - n_{21}\lambda(V_{in} - V_1)}{1 + \lambda + \gamma n_{21}^2}. \quad (26)$$

During this interval $T_{56}$, both the input and magnetizing currents $i_g$ and $i_m$ can decrease linearly.

Interval $T_{67}$ (Time $t_6$ Through Time $t_7$)

At time $t_6$, the diode current $i_{D124}$ zeroes, and only the flyback section 130 of the converter 100 continues to deliver energy to the converter's output through the diode 116. As a consequence, from the equivalent circuit of the converter 100 shown in FIG. 3G, the inductor voltages during the interval $T_{67}$ can be given by:

$$V_{Lm}^{T67} = -\frac{\gamma n_{21} V_2}{1 + \gamma n_{21}^2} \quad (27)$$

$$V_{Ld}^{T67} = 0 \quad (28)$$

$$V_{Ls}^{T67} = -\frac{V_2}{1 + \gamma n_{21}^2}. \quad (29)$$

The input current $i_g$ during this interval $T_{67}$ can remain zero (actually, the primary leakage inductance 106 resonates with the parasitic capacitances of the switch 108 and the diode 124, like any converter operating in the discontinuous mode), and the magnetizing current $i_g$ can continue to decrease in a linear manner.

From this analysis, the following can be observed:
the clamping diode 114 modifies the behavior of the converter 100, making its behavior more similar to that of integrated boost-flyback (IBF) converters with voltage multipliers;
the resonant intervals (intervals $T_{12}$ and $T_{45}$) caused by the diodes' parasitic capacitances 118 at the secondary side of the transformer 102 modify the current waveforms and, thus, the overall voltage conversion ratio of the converter 100; and
the selected operation mode allows a soft turn off of all diodes 114, 116, 124.

Voltage Gain of Non-Isolated Transformer

In order to simplify the determination of the voltage gain in the converter 100, neglect intervals $T_{01}$, $T_{12}$, $T_{34}$, and $T_{45}$. Define the following relative interval durations:

$$d = \frac{T_{01} + T_{12} + T_{23}}{T_s}, \quad d_2 = \frac{T_{56}}{T_s}. \quad (30)$$

Also, consider the following voltage conversion ratios as design constraints:

$$M = \frac{V_{out}}{V_{in}}, \quad M_1 = \frac{V_1}{V_{in}}. \quad (31)$$

At steady state, assume that the inductor average voltages and the capacitor average currents are zero. With the above constraints, the three unknowns d, $d_2$, and $n_{21}$ can be found as follows.

Voltage balance across the magnetizing inductance 104 can be expressed as:

$$\overline{v_{Lm}} \approx V_{Lm}^{23} d + V_{Lm}^{56} d_2 + V_{Lm}^{67}(1-d-d_2) = 0 \quad (32)$$

where $\overline{v_{Lm}}$ is the average voltage on the magnetizing inductance 104.

Voltage balance across the primary leakage inductance 106 can be expressed as:

$$\overline{v_{Ld}} \approx V_{Ld}^{23} d + V_{Ld}^{56} d_2 = 0 \quad (33)$$

where $\overline{v_{Ld}}$ is the average voltage on the primary leakage inductance 106. Current balance across an output filter capacitor at steady state can be expressed as:

$$\overline{i_{D116}} = I_o \quad (34)$$

where $\overline{i_{D116}}$ is the average current across the diode 116 and $I_o$ is the output current of the converter 100.

From FIG. 2, the following can be derived:

$$\overline{i_{D116}} \approx \frac{i_s(t_5)}{2} d_2 + \frac{i_{m1}}{2n_{21}}(1-d) + \frac{i_{m2}}{2n_{21}}(1-d-d_2) \quad (35)$$

where:

$$i_{m1} \approx i_{mpk} + \frac{V_{Lm}^{56}}{L_m f_s} d_2 \quad (36)$$

$$i_{m2} \approx i_{m1} + \frac{V_{Lm}^{67}}{L_m f_s}(1-d-d_2) \quad (37)$$

$$i_{mpk} \approx \overline{i_m} + \frac{V_{Lm}^{23}}{2 L_m f_s} d. \quad (38)$$

Here, $f_s$ denotes the switching frequency of the switch 108, and $\overline{i_m}$ denotes the average magnetizing current. The average magnetizing current can be related to the average input current $\overline{i_g}$ by the following relation (a unity efficiency is assumed for the last equality):

$$\overline{i_g} = \overline{i_m} - n_{21}\overline{i_s} = \overline{i_m} - n_{21}\overline{i_{D124}} = MI_o \quad (39)$$

where $\overline{i_s}$ denotes the average secondary current, and $\overline{i_{D124}}$ denotes the average current across the diode 124. The average diode current $\overline{i_{D124}}$ can be approximated as:

$$\overline{i_{D124}} \approx i_g(t_5)\frac{d_2}{2} = i_{mpk}\frac{d_2}{2} - n_{21} i_s(t_5) \frac{\lambda}{1+\lambda}\frac{d_2}{2} \quad (40)$$

Substituting Equation (40) into Equation (39) provides the following expression for the average magnetizing current $\overline{i_m}$:

$$\overline{i_m} = MI_o + n_{21} i_{mpk} \frac{d_2}{2} - n_{21}^2 i_s(t_5) \frac{\lambda}{1+\lambda}\frac{d_2}{2}. \quad (41)$$

Finally, substituting this expression into Equation (38), the following can be obtained:

$$i_{mpk} \approx \frac{1}{1 - n_{21}\frac{d_2}{2}}\left(MI_o - n_{21}^2 i_s(t_5)\frac{\lambda}{1+\lambda}\frac{d_2}{2} + \frac{V_{Lm}^{23}}{2L_m f_s} d\right) \quad (42)$$

From Equation (34) and dividing by $I_o$ in order to use normalized quantities (indicated by a subscript N), the following can be obtained:

$$\frac{i_{sN}(t_5)}{2}d_2 + \frac{i_{m1N}}{2n_{21}}(1-d) + \frac{i_{m2N}}{2n_{21}}(1-d-d_2) = 1. \quad (43)$$

From Equations (36), (37), and (43), the following can be obtained:

$$i_{m1N} \approx i_{mpkN} + \frac{2V_{LmN}^{56}}{kM}d_2 \quad (44)$$

$$i_{m2N} \approx i_{m1N} + \frac{2V_{LmN}^{67}}{kM}(1-d-d_2) \quad (45)$$

$$i_{mpkN} \approx \frac{1}{1-n_{21}\frac{d_2}{2}}\left(M - n_{21}^2 i_{sN}(t_5)\frac{\lambda}{1+\lambda}\frac{d_2}{2} + \frac{V_{LmN}^{23}}{kM}d\right) \quad (46)$$

where k is a constant. From Equation (23), the following can also be obtained:

$$i_{sN}(t_5) = \frac{2L_m f_s}{kZ_r}\sqrt{2\frac{M_1 - V_{sN}^{T45}}{M} - 1} \quad (47)$$

where:

$$V_{sN}^{T45} = n_{21}\frac{\lambda}{1+\lambda}(1-M_1). \quad (48)$$

Now, Equations (32), (33), and (43) may be combined to form a system that can be numerically solved.

Example Implementation

As a design example, consider the following converter specifications:
Input voltage: $V_{in}$=25–35V;
Output voltage: $V_{out}$=400V;
Nominal output power: $P_o$=300 W; and
Switching frequency: $f_s$=100 kHz.
The value of the magnetizing inductance 104 can be selected based on the desired current ripple and the continuous conduction mode of operation at nominal power. Thus, the following parameter values of the transformer 102 could be selected:
Magnetizing inductance 104: $L_m$=20 µH;
Primary leakage inductance 106: $L_d$=0.4 µH; and
Secondary leakage inductance 112: $L_s$=2 µH.
While the total leakage inductance value is similar to the value measured in different transformer prototypes, the separation into primary and secondary leakage inductances may be somewhat arbitrary. Fortunately, the results of the presented analysis are almost independent of such subdivision. The value of the resonant capacitance 118 can be selected as $C_r$=120 pF (60 pF for each diode 114-116). The voltage constraints can be fixed at $V_1$=150V and $V_{out}$=400V. Using the nominal output power and the maximum input voltage for the calculation of the different voltage conversion ratios, from Equations (32), (33), and (43) the following can be obtained: d=0.625, $d_2$=0.002, and $n_{21}$=4.287.

Using these voltage constraints, a specific implementation of the converter 100 could have the following characteristics. The main component values in this example implementation are listed in Table 1, where $C_{IN}$ and $C_{OUT}$ are input and output filter capacitors, respectively. The transformer parameters in this example implementation are listed in Table 2.

TABLE 1

| Component | Component Value |
| --- | --- |
| Switch 108 | IRFB4127 200 V MOSFET |
| Diodes 114, 116, 124 | RHRP1560 diodes |
| $C_{in}$ | 470 µF at 100 V |
| $C_{out}$ | 2.2 µF at 630 V |
| Capacitors 120, 122 | 1 µF + 220 nF |

TABLE 2

| Transformer Parameter | Parameter Value |
| --- | --- |
| $N_p$ | 8 |
| $N_s$ | 36 |
| $\phi_p$ | 1.69 mm, 1 layer |
| $\phi_s$ | 0.69 mm, 2 layers |
| $L_m$ (magnetic inductance 104) | 23.6 µH |
| $L_{dcc}$ | 375 nH |

Depending on the implementation, the non-isolated converter 100 could provide the following advantages:
the clamping diode 114 naturally clamps the voltage of the rectifier diode 116, thus avoiding the use of dissipative snubber circuits;
the clamping diode 114 allows energy transfer to the output of the converter 100 during the switch 108 on time; and
the resonances caused by the diodes' parasitic capacitances 118 increase the converter's step-up ratio.

Isolated Converter

FIGS. 4 through 6F illustrate an example isolated high step-up ratio converter 400 and related details according to this disclosure. The embodiment of the converter 400 shown in FIG. 4 and its related details are for illustration only.

In this example, the converter 400 includes a transformer 402, which has a magnetizing inductance 404, a primary leakage inductance 406, and a secondary leakage inductance 412. A current $i_m$ flows through the magnetizing inductance 404, a current $i_d$ flows through the primary leakage inductance 406, and a current $i_s$ flows through the secondary leakage inductance 412.

The primary side of the transformer 402 is coupled to a switch 408 and to an additional switch 409. The primary side of the transformer 402 is also coupled to an input voltage source 410 and to a capacitor 411.

The secondary side of the transformer 402 is coupled to a clamping diode 414 and to a rectifying diode 416. The parasitic capacitances of the diodes 414-416 are denoted using an equivalent capacitance 418, which has a resonant capacitance $C_r$ and a resonant voltage $V_r$. The secondary side of the transformer 402 is also coupled to two capacitors 420-422. A load 428 (represented as a resistor) is coupled to output terminals of the converter 400 and receives an output voltage $V_{out}$ and an output current $I_o$.

The switches 408-409 represent any suitable switching devices, such as MOSFET transistors. The input voltage source 410 represents any suitable source of an input voltage, such as a battery or photovoltaic panel. The capacitors 411, 420, 422 represent any suitable capacitors having any suitable capacitance(s). The load 428 could represent any suitable device or system to receive power from the converter 400, such as a conversion stage (like an inverter) configured to provide power to a utility grid.

Figure 4:
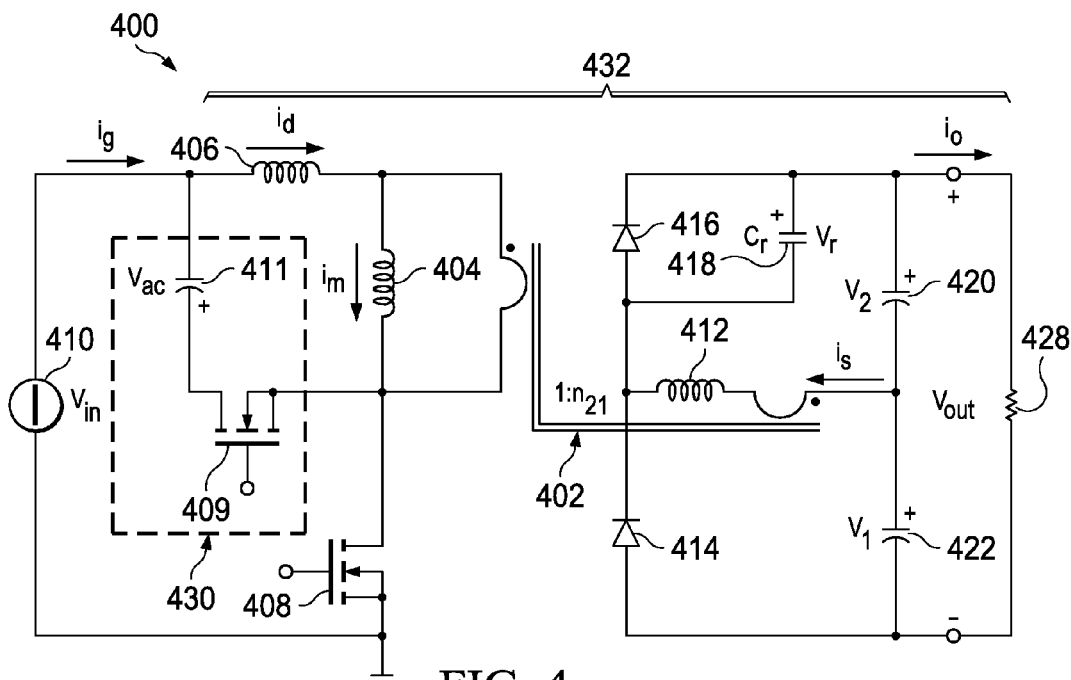
FIGS. 4 through 6F illustrate an example isolated high step-up ratio converter and related details according to this disclosure.
Figure 5:
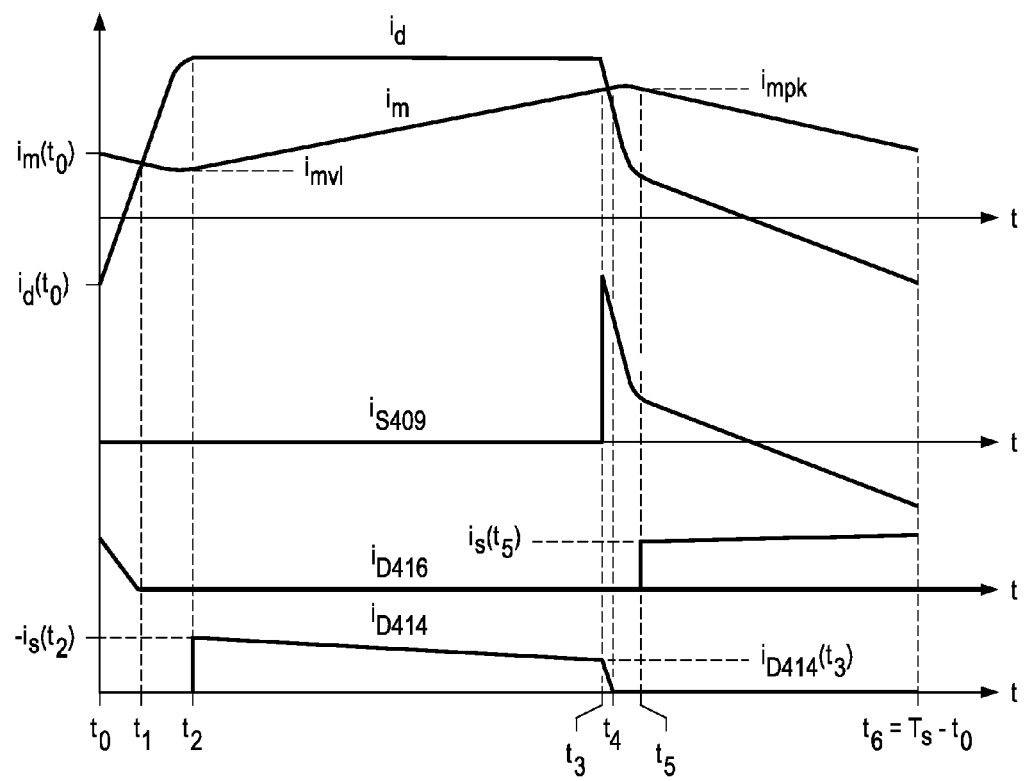

The architecture in FIG. 4 implements a scheme where the converter 400 has an active clamp 430 and a flyback section 432 with a voltage multiplier. FIG. 5 illustrates waveforms associated with example operation of the converter 400 in FIG. 4. More specifically, FIG. 5 illustrates the waveforms in the converter 400 during a switching period $T_s$ that lasts from time $t_0$ to time $t_6$. The waveforms in FIG. 5 assume that the flyback section 432 operates in CCM. In FIG. 5, the current through the switch 409 is denoted $i_{S409}$, and the currents through the diodes 414 and 416 are denoted $i_{D414}$ and $i_{D416}$. Each switching period $T_s$ can be divided into six subintervals, which are denoted below as $T_{01}$-$T_{56}$. The operation of the converter 400 during each of these subintervals is described below.

Interval $T_{01}$ (Time $t_0$ Through Time $t_1$)

Figure 6A:
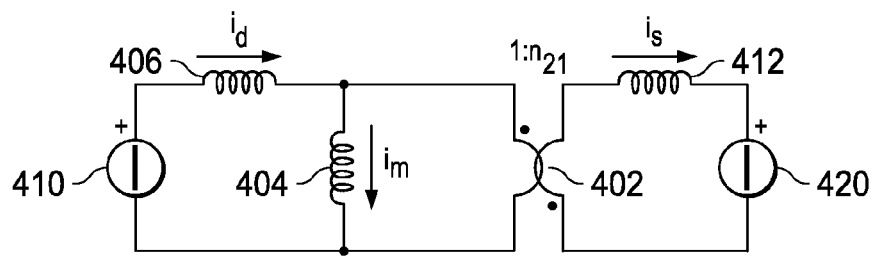

Prior to this interval, the diode 416 is conducting, and the energy stored in the magnetizing inductance 404 is being transferred to the capacitor 420. At time $t_0$, the main switch 408 is turned on, causing the primary leakage inductance current $i_d$ to increase and the diode current $i_{D416}$ through the diode 416 to decrease. Since the diode 416 is still conducting, the magnetizing current $i_m$ decreases linearly. The equivalent circuit of the converter 400 during this interval $T_{01}$ is shown in FIG. 6A, where the capacitor 420 is represented as a voltage source. The inductor voltages across the magnetizing inductance 404, the primary leakage inductance 406, and the secondary leakage inductance 412 during the interval $T_{01}$ can be obtained using Equations (1)-(3) above. The interval $T_{01}$ ends when the input current $i_g$ (and therefore the primary leakage inductance current $i_d$) equals the magnetizing current $i_m$ and the diode current $i_{D416}$ goes to zero.

Interval $T_{12}$ (Time $t_1$ Through Time $t_2$)

Figure 6B:
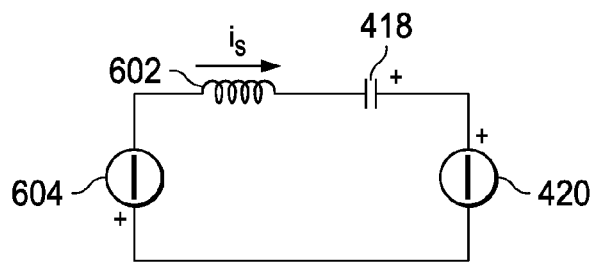

When the currents $i_g$ and $i_d$ equal the magnetizing current $i_m$ at time $t_1$, the diode 416 turns off, allowing a resonance to occur according to the equivalent circuit of the converter 400 shown in FIG. 6B. Here, the resonant capacitance 418 (denoted $C_r$) accounts for the parasitic capacitances of the diodes 414-416, while the resonant inductance 602 (denoted $L_r$) of the diodes 414-416 can be given by Equation (4). A secondary winding voltage 604 of the transformer 402 during the interval $T_{12}$ can be given by Equation (5). When $i_s(t_1)=0$ and $V_r(t_1)=0$, the resonant voltage $V_r(t)$ and the secondary current $i_s(t)$ can be given by Equations (6) and (7) above. The interval $T_{12}$ ends as soon as the voltage $V_r(t)$ equals the output voltage $V_{out}=V_1+V_2$, causing the turn on of the diode 414. The duration $D_{T12}$ of the interval $T_{12}$ can be given by Equation (8) above. The values of the secondary current $i_s$ and the magnetizing current $i_m$ at time $t_2$ can be obtained using Equations (9) and (11) above. The value of the input current $i_g$ and the primary leakage inductance $i_d$ can be obtained using Equation (10) above.

Interval $T_{23}$ (Time $t_2$ Through Time $t_3$)

Figure 6C:
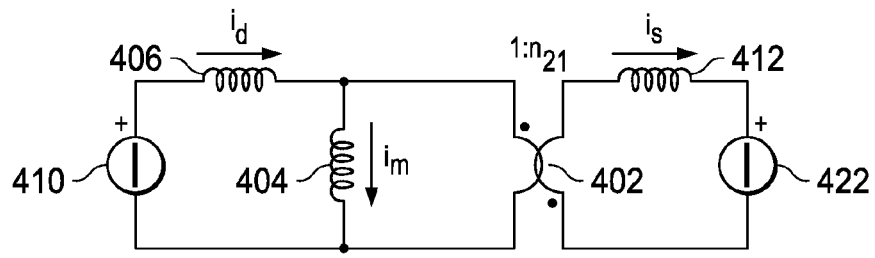
Figure 6D:
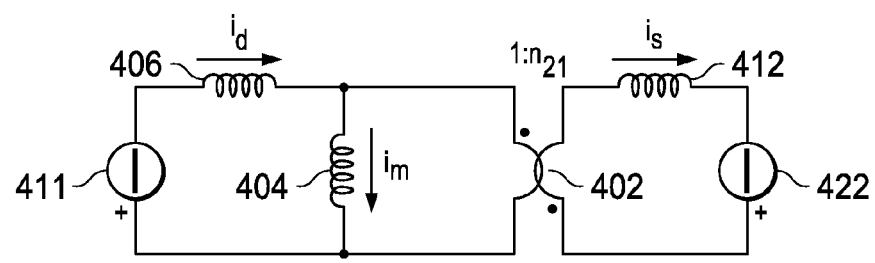

When the diode 414 turns on, the equivalent circuit of the converter 400 becomes as shown in FIG. 6C. The inductor voltages during the interval $T_{23}$ can be given by Equations (12)-(14) above. Once again, the corresponding currents in FIG. 5 can vary linearly during this interval $T_{23}$. Note that the actual slope of the current $i_d$ during this interval may depend on the converter operating point, and it is not necessarily negative as depicted in FIG. 5. Moreover, neglecting the resonance during the interval $T_{12}$, the diode 414 would be conducting during the switch on time only if the condition in Equation (15) is satisfied. However, the presence of the parasitic components causes a non-zero diode current $i_{D414}$ through the diode 414 even if Equation (15) is not satisfied. In this case, the diode current $i_{D414}$ simply has a negative current slope (the voltage $V_{Ls}^{T23}$ is positive), meaning that it can go to zero before the end of the switch on time, thus causing the turn off of the diode 414. In the following analysis, it is assumed that the diode 414 conducts for the whole switch on time interval.

Interval $T_{34}$ (Time $t_3$ Through Time $t_4$)

At time $t_3$, the switch 408 is turned off, causing the conduction of the body diode of the auxiliary switch 409. During this interval $T_{34}$, the diode 414 is still conducting. This gives rise to the equivalent circuit of the converter 400 shown in FIG. 6D, where the capacitor 411 is denoted as a voltage source. The inductor voltages during this interval $T_{34}$ can be expressed as:

$$V_{Lm}^{T34} = \frac{-\lambda V_{ac} + \gamma n_{21} V_1}{1 + \lambda + \gamma n_{21}^2} \quad (49)$$

$$V_{Ld}^{T34} = \frac{-V_{ac}(1 + \gamma n_{21}^2) - \gamma n_{21} V_1}{1 + \lambda + \gamma n_{21}^2} \quad (50)$$

$$V_{Ls}^{T34} = \frac{(1 + \lambda)V_1 + n_{21}\lambda V_{ac}}{1 + \lambda + \gamma n_{21}^2}. \quad (51)$$

Here, $V_{ac}$ denotes the voltage across the capacitor 411.

As shown in FIG. 5, the leakage inductance current $i_d$ rapidly decreases during this interval $T_{34}$, while the magnetizing current $i_m$ continues to increase. This interval $T_{34}$ ends when the primary leakage inductance current $i_d$ equals the magnetizing current $i_m$ and the diode current $i_{D414}$ zeroes. After that, the diode 416 starts conducting after a short resonance stage (interval $T_{45}$) that discharges the resonant capacitance 418 to zero.

Interval $T_{45}$ (Time $t_4$ Through Time $t_5$)

Figure 6E:
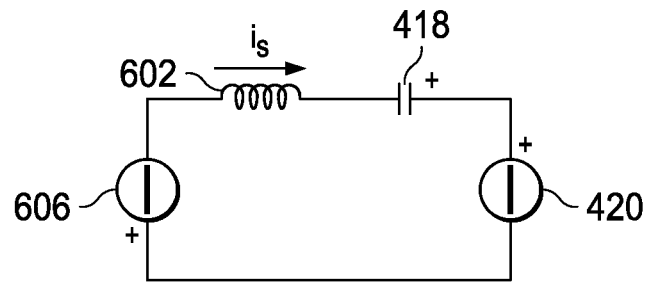

When the diode 414 turns off, a second resonance occurs that brings the voltage of the resonant capacitance 418 to zero, thus turning on the diode 416. The equivalent circuit of the converter 400 during this interval $T_{45}$ is shown in FIG. 6E, where the secondary winding voltage 606 of the transformer 402 during the interval $T_{45}$ (denoted $V_s^{T45}$) can be given by $$V_s^{T45} = -n_{21} V_{ac} \frac{\lambda}{1+\lambda} \quad (52)$$

and $i_s(t_4)=0$ and $V_r(t_4)=V_{out}$. The resonant voltage $V_r(t)$ and the secondary current $i_s(t)$ can be given by Equations (20) and (21). This interval $T_{45}$ ends at time $t_5$ when the resonant voltage becomes zero and the diode 416 turns on, and the interval duration $D_{T45}$ can be given by:

$$\omega_r D_{T45} = a\cos\left(1 - \frac{V_{out}}{V_1 - V_s^{T45}}\right) = a\cos\left(-\frac{V_2 + V_s^{T45}}{V_1 - V_s^{T45}}\right) \quad (53)$$

The value of the secondary current $i_s$ at the end of this interval can be obtained using Equation (23). The values of the primary leakage inductance current $i_d$ and the magnetizing current $i_m$ can be found using expressions similar to Equations (10) and (11) by substituting $t_1$ with $t_4$ and $t_2$ with $t_5$.

Interval $T_{56}$ (Time $t_5$ Through Time $t_6$)

Figure 6F:
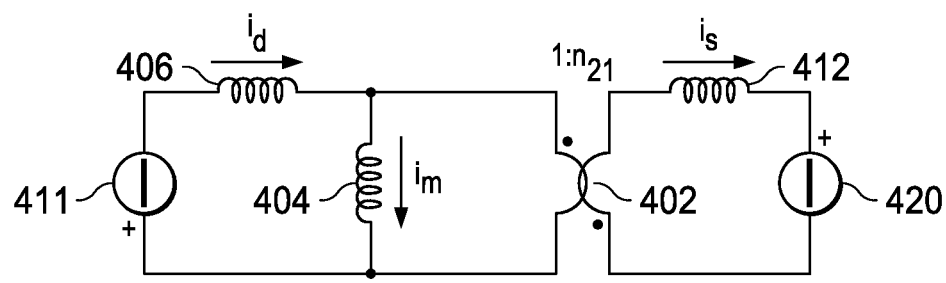

During this interval, the energy stored in the magnetizing inductance 404 is delivered to the flyback section's output, while the energy from the leakage inductance 406 continues to be exchanged with the capacitor 411 according to the equivalent circuit of the converter 400 shown in FIG. 6F. The inductor voltages during this interval $T_{56}$ can be expressed as:

$$V_{Lm}^{T56} = \frac{-\lambda V_{ac} + \gamma n_{21} V_2}{1 + \lambda + \gamma n_{21}^2} \quad (54)$$

$$V_{Ld}^{T56} = \frac{-V_{ac}(1 + \gamma n_{21}^2) - \gamma n_{21} V_2}{1 + \lambda + \gamma n_{21}^2} \quad (55)$$

$$V_{Ls}^{T56} = \frac{-(1 + \lambda)V_2 + n_{21}\lambda V_{ac}}{1 + \lambda + \gamma n_{21}^2}. \quad (56)$$

Both the primary leakage inductance current $i_d$ and the magnetizing current $i_m$ can decrease linearly during this interval $T_{56}$. Also, during this interval, the current $i_d$ reverts its direction flowing through the auxiliary switch 409.

Note that the above analysis has neglected short resonance intervals involving the charge and discharge of the output capacitances of the switches 408-409. In fact, one interesting property of the converter 400 is the possibility of achieving zero voltage turn on of the main switch 408 (the auxiliary switch 409 may always turn on at zero voltage and zero current because its conduction occurs after the conduction of its body diode). One condition for this to occur may be that the energy of the primary leakage inductance 406 at switch 409 turn off (which depends on the inductance value and on the current amplitude $|i_d(t_0)|$ at the switching instant) being enough to completely charge (or discharge) the switches' output capacitances. A suitable dead time can be inserted into the switch driving signals between the turn off of one switch and the turn on of the other switch to accommodate these resonance intervals.

Depending on the implementation, the isolated converter 400 could provide the following advantages:
the secondary side of the transformer 402 with a voltage multiplier naturally clamps the voltage of the rectifier diode 416, thus avoiding the use of dissipative snubber circuits;
the voltage multiplier allows energy transfer to the output also during the switch on time, thus increasing the converter's step-up ratio and its overall efficiency;
the resonances caused by the diodes' parasitic capacitances 418 increase the converter's step-up ratio; and
the resonances caused by the diodes' parasitic capacitances 418 add a degree of freedom during the power stage design because they affect the current value in the active clamp 430.

Note that the non-isolated converter 100 and the isolated converter 400 could be used in any suitable system. For example, either of these converters could be used in any of the photovoltaic systems disclosed in the U.S. patent applications incorporated by reference above. Either of these converters could also be used in any other suitable photovoltaic system or other system where energy is being transferred, such as to couple a single photovoltaic panel to a utility grid or other system.

Figure 7:
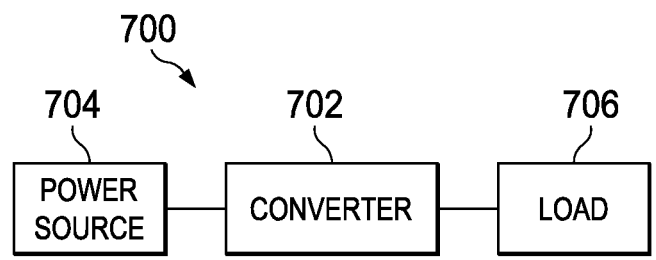
FIG. 7 illustrates an example system with a high step-up ratio converter according to this disclosure.

An example system 700 is shown in FIG. 7, which illustrates a converter 702 coupled between a power source 704 and a load 706. Here, the converter 702 could represent either of the converters 100 and 400 discussed above. The power source 704 could represent any suitable source of power, such as one or more batteries or one or more photovoltaic panels. The load 706 represents any suitable device or system that uses power or distributes power to other components that use the power. The load 706 could, for example, represent a conversion stage (like an inverter) configured to provide power to a utility grid or other power distribution system.

The figures discussed above have illustrated various features of example high step-up ratio converters. However, various changes may be made to these figures. For example, the circuits shown in FIGS. 1 and 4 could include any additional components according to particular needs, and the functions performed by the components in FIGS. 1 and 4 could be implemented using any other circuitry. Also, as noted above, additional subintervals could be added to either FIG. 2 or FIG. 5 according to particular needs. Further, FIGS. 3A-3G and 6A-6F are provided merely to illustrate example operations performed by the converters 100 and 400 during different subintervals of a sampling interval. In addition, FIG. 7 could include any number of power sources, converters, and loads.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A converter circuit comprising:
a transformer comprising a first side and a second side;
a switch coupled to the first side of the transformer;
a rectifying diode coupled to the second side of the transformer and to a first output terminal of the converter circuit; and
a clamping diode coupled to the second side of the transformer, to the rectifying diode, and to a second output terminal of the converter circuit, wherein the converter circuit comprises a boost section and a flyback section and wherein the boost section comprises:
the switch; and
a boost diode coupled to the switch and to the first side of the transformer; and
the flyback section comprises:
the rectifying diode;
the clamping diode; and
first and second capacitors coupled to the rectifying diode, to the boost diode, and to the second side of the transformer; and
wherein the second capacitor is coupled to the first capacitor, to the boost diode, and to the second side of the transformer;
the converter circuit is configured to operate in seven different operation modes during a switching period;
the switch is closed in a first of the operational modes;
the rectifying diode is turned off and a first resonance occurs in a second of the operational modes;

the clamping diode is turned on in a third of the operational modes;
the switch is opened and the boost diode is turned on in a fourth of the operational modes;
the clamping diode is turned off and a second resonance occurs in a fifth of the operational modes;
the rectifying diode is turned on in a sixth of the operational modes; and
the boost diode is turned off in a seventh of the operational modes.

2. A converter circuit comprising:
a transformer comprising a first side and a second side;
a switch coupled to the first side of the transformer;
a rectifying diode coupled to the second side of the transformer and to a first output terminal of the converter circuit; and
a clamping diode coupled to the second side of the transformer, to the rectifying diode, and to a second output terminal of the converter circuit,
wherein the converter circuit comprises an active clamp and an isolated flyback section; and
the switch comprises a first switch;
the active clamp comprises:
the first switch;
a second switch coupled to the first side of the transformer and to the first switch; and
a first capacitor coupled to the first side of the transformer and to the second switch; and
the flyback section comprises:
  the rectifying diode;
  the clamping diode; and
  second and third capacitors coupled across the output terminals;
  wherein the second capacitor is coupled to the rectifying diode and to the second side of the transformer; and
  wherein the third capacitor is coupled to the second side of the transformer and to the second capacitor.

3. The converter circuit of claim 2, wherein:
the converter circuit is configured to operate in six different operational modes during a switching period;
the first switch is closed in a first of the operational modes;
the rectifying diode is turned off and a first resonance occurs in a second of the operational modes;
the clamping diode is turned on in a third of the operational modes;
the first switch is opened and the second switch is closed in a fourth of the operational modes;
the clamping diode is turned off and a second resonance occurs in a fifth of the operational modes; and
the rectifying diode is turned on in a sixth of the operational modes.

4. A system comprising:
a power source;
a converter circuit comprising:
a transformer comprising a first side and a second side, the first side of the transformer coupled to the power source;
a switch coupled to the first side of the transformer;
a rectifying diode coupled to the second side of the transformer and to a first output terminal of the converter circuit; and
a clamping diode coupled to the second side of the transformer, to the rectifying diode, and to a second output terminal of the converter circuit, wherein the converter circuit comprises a boost section and a flyback section;
the boost section comprises:
the switch;
an input voltage source coupled to the first side of the transformer; and
a boost diode coupled to the switch and to the first side of the transformer; and
the flyback section comprises:
the rectifying diode;
the clamping diode; and
first and second capacitors coupled across the output terminals;
wherein the first capacitor is coupled to the rectifying diode, to the boost diode, and to the second side of the transformer; and
wherein the second capacitor is coupled to the first capacitor, to the boost diode, and to the second side of the transformer;
the converter circuit is configured to operate in seven different operational modes during a switching period;
the switch is closed in a first of the operational modes; the rectifying diode is turned off and a first resonance occurs in a second of the operational modes;
the clamping diode is turned on in a third of the operational modes;
the switch is opened and the boost diode is turned on in a fourth of the operational modes;
the clamping diode is turned off and a second resonance occurs in a fifth of the operational modes;
the rectifying diode is turned on in a sixth of the operational modes; and
the boost diode is turned off in a seventh of the operational modes.

5. A system comprising:
a power source; and
a converter circuit comprising:
a transformer comprising a first side and a second side, the first side of the transformer coupled to the power source;
a switch coupled to the first side of the transformer;
a rectifying diode coupled to the second side of the transformer and to a first output terminal of the converter circuit;
a clamping diode coupled to the second side of the transformer, to the rectifying diode, and to a second output terminal of the converter circuit, wherein the converter circuit comprises an active clamp and an isolated flyback section
and, wherein:
the switch comprises a first switch;
the active clamp comprises:
the first switch;
a second switch coupled to the first side of the transformer and to the first switch; and
a first capacitor coupled to the first side of the transformer and to the second switch; and
the flyback section comprises:
the rectifying diode;
the clamping diode; and
second and third capacitors coupled across the output terminals;
wherein the second capacitor is coupled to the rectifying diode and to the second side of the transformer; and
wherein the third capacitor is coupled to the second side of the transformer and to the second capacitor.

6. The system of claim 5, wherein:
the converter circuit is configured to operate in six different operational modes during a switching period;
the first switch is closed in a first of the operational modes;
the rectifying diode is turned off and a first resonance occurs in a second of the operational modes;
the clamping diode is turned on in a third of the operational modes;
the first switch is opened and the second switch is closed in a fourth of the operational modes;
the clamping diode is turned off and a second resonance occurs in a fifth of the operational modes; and the rectifying diode is turned on in a sixth of the operational modes.

7. The system of claim 4, wherein the output terminals of the converter circuit are coupled to a load.

8. A method comprising:
closing a switch in a first operational mode of a converting circuit, the switch coupled to a first side of a transformer;
turning off a rectifying diode and allowing a first resonance to occur in a second operational mode of the converting circuit, the rectifying diode coupled to a second side of the transformer and to a first output terminal of the converter circuit;
turning on a clamping diode in a third operational mode of the converting circuit, the clamping diode coupled to the second side of the transformer, to the rectifying diode, and to a second output terminal of the converter circuit;
opening the switch in a fourth operational mode of the converting circuit;
turning off the clamping diode and allowing a second resonance to occur in a fifth operational mode of the converting circuit; and
turning on the rectifying diode in a sixth operational mode of the converting circuit.

9. The method of claim 8, further comprising:
turning on a boost diode in the fourth operational mode, the boost diode coupled to the switch, to the first side of the transformer, and to the second side of the transformer; and
turning off the boost diode in a seventh operational mode of the converting circuit.

10. The method of claim 8, wherein:
the switch comprises a first switch; and
further comprising:
closing a second switch in the fourth operational mode, the second switch coupled to the first side of the transformer, to the first switch, and to a capacitor, wherein the capacitor is coupled to the first side of the transformer.

* * * * *